United States Patent [19]

Yeh et al.

[11] Patent Number: 5,106,677
[45] Date of Patent: Apr. 21, 1992

[54] STYRENE-BUTADIENE COMPOSITIONS HAVING IMPROVED BARRIER PROPERTIES

[75] Inventors: Gene H. Yeh, San Ramon; Stephen O. Cook, Mill Valley, both of Calif.

[73] Assignee: James River II Inc.

[21] Appl. No.: 431,605

[22] Filed: Nov. 3, 1989

Related U.S. Application Data

[63] Continuation-in-part of Ser. No. 188,923, May 2, 1988, abandoned.

[51] Int. Cl.$^5$ .............................. B32B 3/26; B32B 5/20
[52] U.S. Cl. .................................. 428/220; 428/318.6; 428/318.8; 428/484; 524/487; 524/489; 521/92; 521/97; 521/98; 521/139
[58] Field of Search ................ 525/232; 524/487, 489; 428/318.6, 318.8, 220

[56] References Cited

U.S. PATENT DOCUMENTS

| | | | |
|---|---|---|---|
| 2,994,677 | 8/1961 | Bohnert et al. | 525/232 |
| 3,649,579 | 3/1972 | Gobran et al. | 428/521 X |
| 3,939,237 | 2/1976 | Naito et al. | 428/904 X |
| 4,042,551 | 8/1977 | Kruse | 260/28.5 B |
| 4,098,944 | 7/1978 | Pollock | 428/284 |
| 4,110,500 | 8/1978 | Evans et al. | 428/521 X |
| 4,216,131 | 8/1980 | Himes et al. | 524/505 X |
| 4,229,406 | 10/1980 | Pollock | 264/321 |
| 4,329,265 | 5/1982 | Hallenbeck | 524/496 |
| 4,537,915 | 8/1985 | Oberle et al. | 521/84.1 |
| 4,585,679 | 4/1986 | Karabedian | 428/36.5 X |
| 4,897,291 | 1/1990 | Kim | 427/393 |
| 4,918,130 | 4/1990 | Kano et al. | 524/499 |

FOREIGN PATENT DOCUMENTS 2038860 7/1980 United Kingdom ................ 524/489

Primary Examiner—George F. Lesmes
Assistant Examiner—Terrel Morris

[57] ABSTRACT

The barrier properties, particularly water vapor transmission rate, of compositions comprising a stryene-butadiene polymer can be improved substantially by adding from about 0.5 to 10 percent of a polyethylene type wax to the composition.

4 Claims, 2 Drawing Sheets

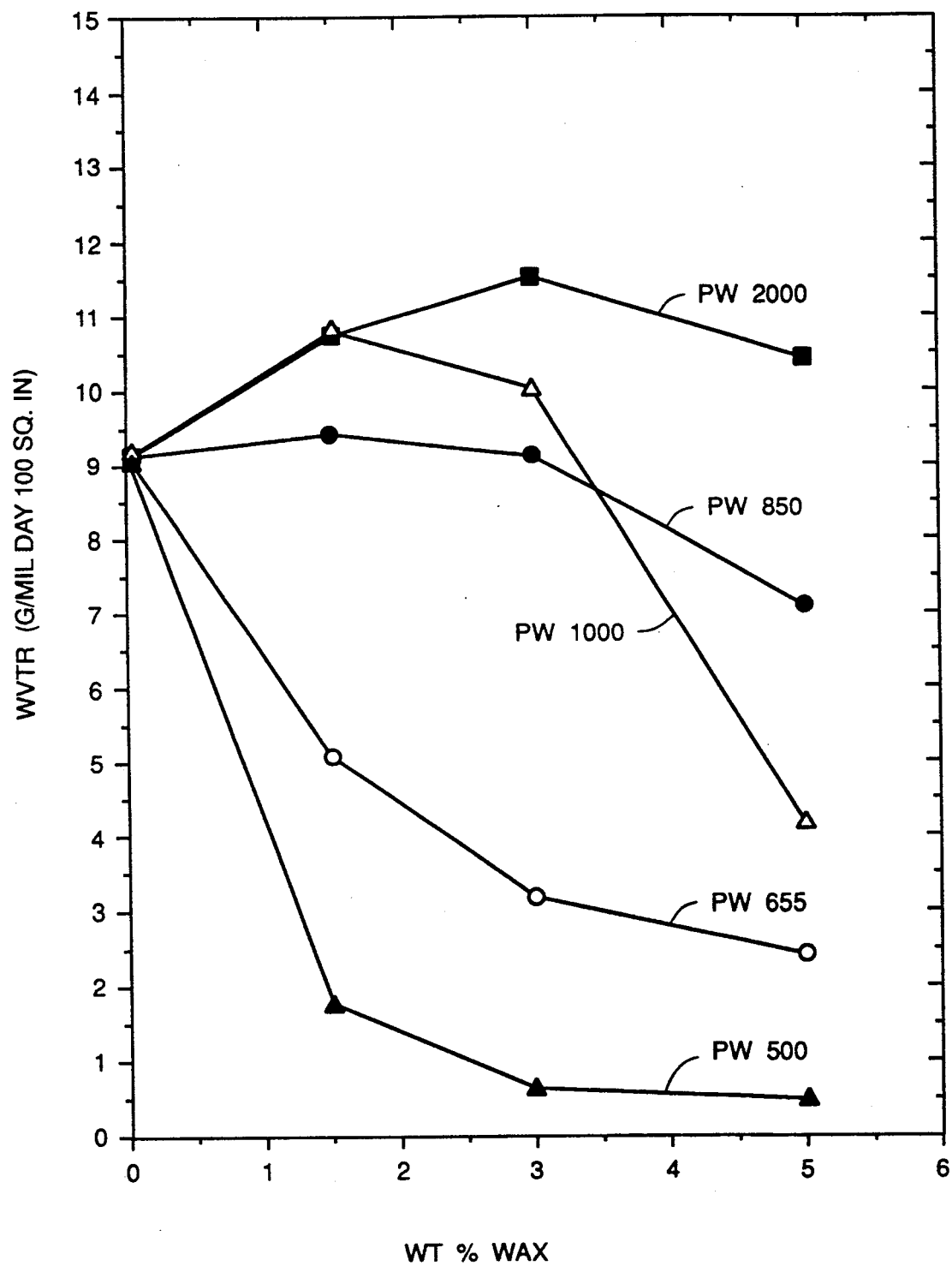
FIG._1

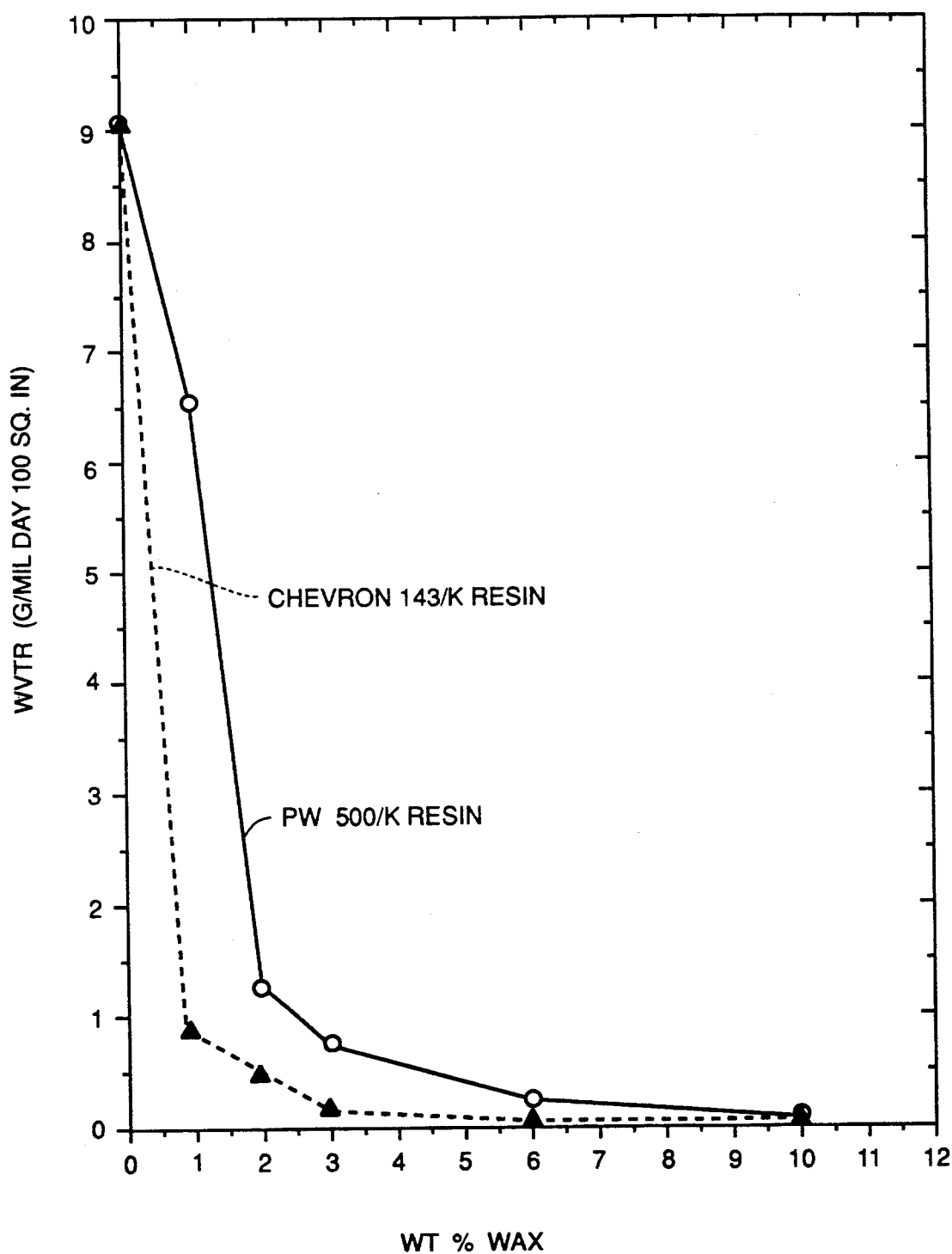
FIG._2

STYRENE-BUTADIENE COMPOSITIONS HAVING IMPROVED BARRIER PROPERTIES

This is a continuation-in-part of Ser. No. 188,923 filed May 2, 1988, now abandoned.

This invention provides compositions of styrene-butadiene polymers having improved barrier properties. Styrene-butadiene polymers are amorphous block copolymers made by catalytic solution polymerization of styrene and 1,3-butadiene or 2-methyl-1,3-butadiene. The polymers are available commercially from Phillips Petroleum under the trademark K-Resin, from Firestone under the trademark Stereon, and from Shell under the trademark Kraton. They can be formed into articles by blown or cast film extrusion, thermoforming, and extrusion-blow or injection-blow molding. An important property of such articles when they are used to package certain goods, especially food, is the ability of the article to act as a barrier to moisture, oxygen and aroma.

In accordance with this invention, the barrier properties of styrene-butadiene (S-B) polymer compositions are substantially improved by adding to the compositions a certain amount of wax. The amount of wax is preferably between about 0.5 and 10 percent, more preferably between about 1 and 5 percent, by weight based on the weight of the composition. Within this range the wax reduces the water vapor transmission rate (WVTR) of films made from the S-B polymer compositions at least four fold, preferably at least ten fold, and more preferably at least forty fold. Similarly, the wax reduces the oxygen transmission rate (OTR) at least three fold, preferably at least six fold. The S-B polymer preferably contains from about 60 to 90 percent polymer units derived from styrene. Although the polymer is derived mostly from styrene, wax does not substantially improve the WVTR of polystyrene.

BRIEF DESCRIPTION OF THE DRAWINGS

FIGS. 1 and 2 are graphs showing the relationship between water vapor transmission rate and the concentration in S-B polymer of waxes having different molecular weights.

The wax is preferably a polyethylene type wax and preferably has an average chain length between about 22 and 65 carbon atoms, a molecular weight between about 300 and 800, and a melting point between about 125° and 211° F. (52° and 99° C.). These waxes include paraffin waxes, microcrystalline waxes, intermediate waxes and synthetic polyethylene waxes. Most preferred are paraffin waxes, which typically have an average chain length between about 22 and 40 carbon atoms, a molecular weight between about 300 and 450, and a melting point between about 125° and 160° F. (52° and 71° C.). Best results have been observed with paraffin wax available commercially under the designation Chevron 143. It has a melting point of about 143° F. (62° C.), an average chain length of 29 carbon atoms, an average molecular weight of about 417, a normal paraffin content of about 75 percent, and contains about 12 percent $C_{28}$ fraction, 12 percent $C_{29}$ fraction, and 11 percent $C_{30}$ fraction (the three largest fractions in the wax).

Synthetic polypropylene waxes, preferably those having a molecular weight below about 2000, may also be suitable.

The composition may contain polymers other than the S-B polymer, such as a styrene polymer. As used herein, the term styrene polymer refers to polystyrene, poly(p-methylstyrene), rubber-modified polystyrene, and rubber-modified poly(p-methylstyrene). Rubber-modified (also known as high impact) styrene polymers are prepared by polymerizing styrene or p-methylstyrene in the presence of a rubber such as polybutadiene with a free radical catalyst such as benzoylperoxide under conditions that promote grafting of polystyrene or poly(p-methylstyrene) onto the rubber backbone. The rubber generally comprises 1 to 20 weight percent, preferably 4 to 10 weight percent, of the polymer. The styrene polymer is preferably polystyrene or poly(p-methylstyrene), more preferably polystyrene.

The composition may also contain, in addition to the styrene polymer, a propylene polymer. As used herein, the term propylene polymer refers to propylene homopolymer and copolymers of propylene with butylene or up to 7 percent ethylene by weight. Copending application Ser. No. 188,923 teaches that a polyethylene type wax substantially improves the barrier properties of propylene polymers and other alpha-olefin polymers. However, the wax adversely affects the stiffness of the propylene polymers. In accordance with this invention, the stiffness of the wax-containing propylene polymer compositions are improved by adding a styrene polymer to the composition. S-B polymer is also added to the composition as a compatibilizing agent.

The compositions of this invention preferably comprise from about 5 to about 99.5 percent S-B polymer, from about zero to about 50 percent styrene polymer, from about zero to 80 percent propylene polymer, and from about 0.5 to about 10 percent of a polyethylene type wax.

The compositions of this invention may be formed into films, sheets (which may be thermoformed), and molded containers. The films and sheets may be coextruded films and sheets wherein the composition of this invention forms one or more of the layers, which may be in the form of foam. The thickness of the films and sheets is preferably between about 0.5 and 50 mils.

In the following examples, WVTR was measured at 100° F. (38° C.) and 90 percent relative humidity in accordance with ASTM E96 and TAPPI Standard T464. The units are grams/100 square inches/24 hours. OTR was measured at 72° F. (22° C.) and 45 percent relative humidity in accordance with ASTM D3985-81. The units are cc/100 square inches/24 hours.

EXAMPLE 1

Single layer films were prepared by extruding blends of an S-B polymer having a styrene content of 75 percent (Phillips K-Resin KR-10) with various amounts of different waxes. The films were cooled immediately after extrusion by contacting them with a chill roll having a temperature of 10° C. (50° F.). The thickness of the films ranged from 1.6 to 2.7 mils. The WVTR of each film was measured. The results are shown in FIGS. 1 and 2. Best results were obtained when the wax was Chevron 143 paraffin wax, as shown in FIG. 2. The other waxes employed were synthetic polyethylene waxes available commercially from Petrolite Corporation under the designations Polywax 500, 655, 850, 1000 and 2000. The number indicates the molecular weight of the wax except Polywax 655 has a molecular weight of 700. As shown in FIG. 1, with one anomalous exception, the lower the molecular weight of the wax, the lower the WVTR of the film.

EXAMPLE 2

An extruded film having a thickness of one mil was prepared from a composition consisting of S-B polymer (Phillips K-Resin KR-10) and three percent paraffin wax (Chevron 143). The film had a WVTR of 0.2 and an OTR of 110. In comparison, a film prepared under the same conditions from the same composition containing no wax had a WVTR of 9.0 and an OTR of 720. Hence, the wax lowered the WVTR of the film 45 fold and lowered the OTR over six fold.

EXAMPLE 3

Example 2 was repeated except crystalline polystrene (Dow Styron LR-175) was substituted for twenty percent of the S-B polymer. The film had a WVTR of 0.4 and an OTR of 200.

EXAMPLE 4

Example 3 was repeated except the polystyrene was substituted for fifty percent of the S-B polymer. The film had a WVTR of 0.7 and an OTR of 240.

EXAMPLE 5

An extruded film having a thickness of 4.5 mils was prepared from a composition consisting of 5 percent S-B polymer (Phillips K-resin KR-10), 10 percent polystyrene (Dow Styron LR-175), 80 percent propylene homopolymer (Huntsman 5384), and 5 percent synthetic polyethylene wax (Petrolite Polywax 500). The film had a WVTR/mil of 0.4.

EXAMPLE 6

A coextruded film having a layer of polystyrene and a layer of S-B polymer containing three percent paraffin wax was prepared. The film had a WVTR/mil of 0.3.

EXAMPLE 7

Example 6 was repeated except the polystyrene was foamed by the addition of 0.05 percent of a mixture of citric acid and sodium bicarbonate as a blowing agent. The sheet had a thickness of 40 mils, a density of 0.48, and a WVTR/mil of 0.15.

EXAMPLE 8

Example 7 was repeated except the S-B polymer contained no wax. The sheet had a WVTR/mil of 0.91.

EXAMPLE 9

A coextruded film having two layers and a thickness of one mil was prepared. One layer consisted of a blend of 70 percent polybutylene and 30 percent polypropylene. The other layer consisted of a blend of 70 percent polypropylene, 20 percent polystyrene, 5 percent S-B polymer, and 5 percent polyethylene wax (Polywax 500). The film had a WVTR of 0.07.

EXAMPLE 10

A coextruded film having the following structure is prepared:

PS/S-B+wax/tie/EVOH/tie/S-B+wax/PS where PS is polystyrene, wax is 3 percent paraffin wax, EVOH is ethylene-vinyl alcohol, and tie is an adhesive polymer. The wax-containing layers protect the EVOH layer from the adverse effects of moisture on the oxygen barrier property of the EVOH layer.

EXAMPLE 11

A coextruded sheet having the following structure was prepared:

PS/S-B+wax/PS where PS and wax are as described in Example 10. The core layer is caused to foam by the addition of 0.05 percent of a mixture of citric acid and sodium bicarbonate as a blowing agent. The sheet had a thickness of 40 mils. The sheet is useful for packaging applications. The core and skin layers may be reversed if desired.

We claim:

1. An extruded film or sheet suitable for packaging goods, particularly food, the film or sheet having a thickness from about 0.5 to 50 mils and containing a layer comprising a blend of a) an amorphous block copolymer made by catalytic solution polymerization of styrene and a comonomer selected from the group consisting of 1,3-butadiene and 2-methyl-1,3-butadiene, the block copolymer containing from 60 to 90 percent polymer units derived from styrene, and b) from about 0.5 to about 10 percent, by weight based on the weight of the blend, of a polyethylene type wax having a molecular weight between about 300 and 800, the wax reducing the water vapor transmission rate of the film or sheet at least four fold.

2. The film or sheet of claim 1 wherein the blend comprises from about 5 to about 99.5 percent of the block copolymer, from about zero to about 50 percent styrene polymer, and from about zero to about 80 percent propylene polymer.

3. The film or sheet of claim 1 wherein the wax is a paraffin wax.

4. The film or sheet of claim 1 wherein the layer comprising the blend is in the form of a foam.

* * * * *